(12) United States Patent
Kim

(10) Patent No.: US 8,966,535 B2
(45) Date of Patent: Feb. 24, 2015

(54) BROADCAST RECEIVING DEVICE AND METHOD FOR SEARCHING CHANNELS THEREOF

(75) Inventor: Soo-hyang Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1183 days.

(21) Appl. No.: 11/783,636

(22) Filed: Apr. 11, 2007

(65) Prior Publication Data

US 2008/0098427 A1    Apr. 24, 2008

(30) Foreign Application Priority Data

Oct. 23, 2006    (KR) .................. 10-2006-0103110

(51) Int. Cl.
| | | |
|---|---|---|
| H04N 5/445 | (2011.01) | |
| H04N 5/50 | (2006.01) | |
| H04N 21/434 | (2011.01) | |
| H04N 21/438 | (2011.01) | |
| H04N 21/44 | (2011.01) | |
| H04N 21/4405 | (2011.01) | |
| H04N 21/4623 | (2011.01) | |
| H04N 21/485 | (2011.01) | |

(52) U.S. Cl.
CPC .............. *H04N 5/50* (2013.01); *H04N 5/44513* (2013.01); *H04N 21/4345* (2013.01); *H04N 21/4383* (2013.01); *H04N 21/44008* (2013.01); *H04N 21/4405* (2013.01); *H04N 21/4623* (2013.01); *H04N 21/485* (2013.01)
USPC .................................. 725/50; 725/25; 725/31

(58) Field of Classification Search
CPC ............ H04N 21/4622; H04N 21/482; H04N 21/4826
USPC .......... 725/38, 31, 82, 91, 103, 114, 138, 144
See application file for complete search history.

(56) References Cited

U.S. PATENT DOCUMENTS

| | | | | |
|---|---|---|---|---|
| 5,602,580 | A | * | 2/1997 | Tseng ............................ 348/729 |
| 5,649,318 | A | * | 7/1997 | Lusignan ......................... 725/70 |
| 5,973,609 | A | * | 10/1999 | Schoch .......................... 370/449 |
| 7,092,044 | B2 | | 8/2006 | Inui et al. |

(Continued)

FOREIGN PATENT DOCUMENTS

| | | |
|---|---|---|
| EP | 0949811 A1 | 10/1999 |
| JP | 2002-344829 A | 11/2002 |

(Continued)

OTHER PUBLICATIONS

Communication dated Aug. 29, 2012, issued by the Korean Intellectual Property Office in counterpart Korean Application No. 10-2006-0103110.

*Primary Examiner* — Pankaj Kumar
*Assistant Examiner* — Timothy Newlin
(74) *Attorney, Agent, or Firm* — Sughrue Mion, PLLC

(57) ABSTRACT

A broadcast receiving device which automatically detects whether digital channels are scrambled according to a command and a method for searching channels thereof are provided. The broadcast receiving device includes a channel map storage unit which stores broadcast channel data regarding broadcast channel, an input unit which receives a command, and a channel searching unit which scans digital channels among the broadcast channel data according to the command and detects whether the digital channels are scrambled.

14 Claims, 8 Drawing Sheets

(56) References Cited

U.S. PATENT DOCUMENTS

| | | |
|---|---|---|
| 7,380,263 B2 * | 5/2008 | Shintani ............................ 725/59 |
| 2002/0186327 A1 | 12/2002 | Inui et al. |
| 2004/0036811 A1 * | 2/2004 | Ikeguchi ........................ 348/732 |
| 2004/0261098 A1 * | 12/2004 | Macrae et al. .................... 725/31 |
| 2005/0053356 A1 * | 3/2005 | Mate et al. ........................ 386/52 |
| 2007/0136747 A1 * | 6/2007 | Inui et al. ......................... 725/37 |
| 2008/0298586 A1 * | 12/2008 | Lee et al. ...................... 380/210 |

FOREIGN PATENT DOCUMENTS

| | | |
|---|---|---|
| WO | 96/37999 A1 | 11/1996 |
| WO | 97/42759 A1 | 11/1997 |
| WO | 2007/073370 A1 | 6/2007 |

* cited by examiner

```
 9 - 1    delete
     2    add
     4    add
     5    add
11 - 2    delete
     3    delete
     5    add
12 - 1    add
     2    delete
```

FIG. 5F

```
 9 - 1    delete
     4    add
11 - 2    delete
     5    add
12 - 2    delete
```

BROADCAST RECEIVING DEVICE AND METHOD FOR SEARCHING CHANNELS THEREOF

CROSS-REFERENCE TO RELATED APPLICATIONS

This application claims priority from Korean Patent Application No. 10-2006-0103110, filed on Oct. 23, 2006, in the Korean Intellectual Property Office, the entire contents of which are incorporated herein by reference.

BACKGROUND OF THE INVENTION

1. Field of the Invention

Apparatus and methods consistent with the present invention relate to searching channels, and more particularly, to updating data regarding effective channels by automatically detecting whether stored digital channels are scrambled according to a user command and a method for searching channels thereof.

2. Description of the Related Art

Recently, as digital broadcasting, i.e., digital cable broadcasting, digital satellite broadcasting and digital terrestrial wave broadcasting, has developed, the number of viewable channels has surpassed 100 and continues to increase.

In contrast to public broadcasting, viewers must pay television subscription fees to digital broadcast providers to view desired channels, and digital broadcast providers produce a high quality of broadcast programs using the fees. To protect such broadcast programs and view rights of subscribers, the digital broadcast providers utilize a conditional access system (CAS) so that only subscribers may view the programs.

Using the CAS, digital broadcast providers scramble and transmit broadcast signals according to their own encryption system, and only subscribers can descramble the broadcast signals to view the broadcast program. Broadcast signals are scrambled by introducing particular signals into the broadcast signals or disordering the scan lines, resulting in abnormal images. Such scrambling can be decoded using a decoder dedicated to scrambling. In the United States, scrambling is decoded by inserting a cable card.

In general, viewers wish to view only a few channels among the large number provided, and thus subscribe to only a few digital broadcast services. Accordingly, there are fewer channels viewable to viewers than non-viewable scrambled channels, and as digital broadcast providers and channels increase, viewers find a greater proportion of scrambled channels. As a result, if a user searches for channels to view digital broadcasting, more scrambled channels are searched than viewable channels, resulting in user inconvenience such as increased searching time.

Therefore, modern televisions not using a cable card are configured to determine whether a channel is a scrambled channel when automatically setting channels, and to delete a channel if it is a scrambled channel. However, scrambled channels are deleted while automatically setting channels, so the user does not realize even there are scrambled channels. Additionally, as digital broadcast providers scramble and descramble a channel, automatic channel setting is carried out again in order to delete channels which have changed from a descrambled state to a scrambled state, and to recover channels which were deleted while automatically setting channels if they have changed to a descrambled state. If the automatic channel setting is carried out again, all of the physical transmission channels (PTCs) have to be tuned to search channels having a broadcast signal and detect whether the channels are scrambled. Consequently, this takes a considerable length of time.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

In order to achieve the above-described and other aspects of exemplary embodiments of the present invention, a broadcast receiving device is provided comprising a channel map storage unit which stores broadcast channel data regarding a broadcast channel, an input unit which receives a user command, and a channel searching unit which scans digital channels among the broadcast channel data according to the user command and detects whether the digital channels are scrambled.

The device may further comprise a storage unit which stores data regarding effective channels, and a controller which updates the data stored in the storage unit according to the detection results of the channel searching unit.

If the channel searching unit detects digital channels changed from a scrambled state to a descrambled state, the controller may add data regarding the detected digital channels to the storage unit, and if the channel searching unit detects digital channels changed from a descrambled state to a scrambled state, the controller may delete data regarding the detected digital channels from the storage unit.

The device may further comprise a tuner which tunes a channel to one of the effective channels stored in the storage unit in response to a channel change command if the channel change command is input to the input unit.

The device may further comprise an on-screen display (OSD) processor which displays the detection result of the channel searching unit in an OSD form.

The device may further comprise an OSD processor which displays information regarding channels having a changed state regarding scrambling in the OSD form if the channel searching unit detects the channels, wherein the controller adds or deletes data regarding the channels displayed in OSD form to or from the storage unit according to a user command input through the input unit.

The device may further comprise an OSD processor which displays information and an add or a delete menu regarding channels having a changed state regarding scrambling in the OSD form if the channel searching unit detects the channels, wherein the controller adds data regarding channels corresponding to the add menu to the storage unit if the add menu is selected, and the controller deletes data regarding channels corresponding to the delete menu from the storage unit if the delete menu is selected.

In order to achieve the above-described and other aspects of the exemplary embodiments of the present invention, a method for searching channels of a broadcast receiving device comprising a memory which stores pre-scanned broadcast channel data is provided, the method comprising (a) reading out the broadcast channel data from the memory, (b) detecting data regarding digital channels from the broadcast channel data, (c) scanning the detected digital channels and detecting a state regarding scrambling of the digital channels, and (d) updating pre-stored data regarding effective channels according to the detection results.

In operation (d), if digital channels which have changed from a scrambled state to a descrambled state are detected, data regarding the detected digital channels may be added to the effective channel, and if digital channels which have changed from a descrambled state to a scrambled state are detected, data regarding the detected digital channels may be deleted from the effective channels.

The method may further comprise tuning a channel to one of the effective channels stored in the storage unit in response to a channel change command if the channel change command is input.

In operation (c), the detection results may be displayed in an OSD form.

In operation (c), information regarding channels having a changed state regarding scrambling may be displayed in OSD form if the channels are detected, and in operation (d), data regarding the channels displayed in the OSD form may be added to or deleted from the effective channels according to a user command.

In operation (c), information and an add or a delete menu regarding channels having a changed state regarding scrambling may be displayed in OSD form if the channels are detected, and in operation (d), data regarding channels corresponding to the add menu may be added to the effective channels if the add menu is selected, and data regarding channels corresponding to the delete menu may be deleted from the effective channels if the delete menu is selected.

BRIEF DESCRIPTION OF THE DRAWINGS

The above and other aspects of the present invention will become more apparent by describing in detail exemplary embodiments thereof with reference to the attached drawing figures, in which:

FIGS. 5A-5F illustrate on-screen displays of the results of detecting whether to be scrambled by the broadcast receiving device of FIG. 4;

DETAILED DESCRIPTION OF EXEMPLARY EMBODIMENTS OF THE PRESENT INVENTION

Figure 1:
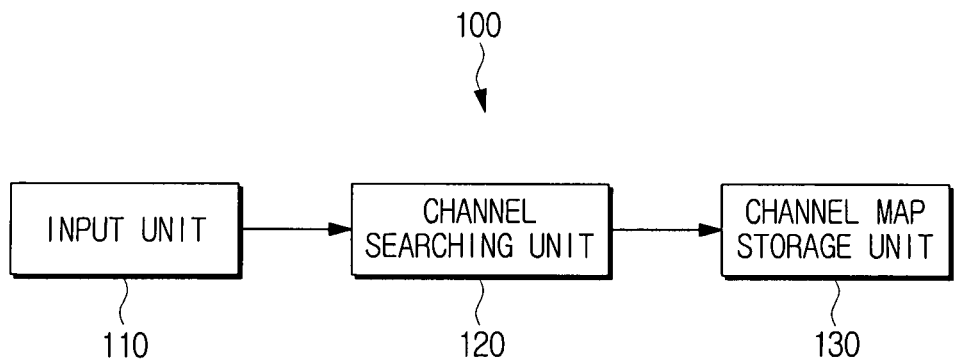
FIG. 1 is a block diagram of the configuration of a broadcast receiving device according to an exemplary embodiment of the present invention.

Reference will now be made in detail to the present exemplary embodiments of the present invention, examples of which are illustrated in the accompanying drawings, wherein like reference numerals refer to like elements throughout. The exemplary embodiments are described below in order to explain the present invention by referring to the figures.

FIG. 1 is a block diagram of the configuration of a broadcast receiving device according to an exemplary embodiment of the present invention. In FIG. 1, the broadcast receiving device 100 comprises an input unit 110, a channel searching unit 120 and a channel map storage unit 130.

The broadcast receiving device 100 detects whether digital channels are scrambled using pre-stored broadcast channel data regarding channels having a broadcast signal if a user command is input.

In general, digital broadcast receivers comprise a tuner, a demultiplexer, an audio buffer, a video buffer, a data buffer and a decoder, which are not shown, and store the broadcast channel data regarding channels having a broadcast signal. The process of storing the broadcast channel data is briefly described below.

If the power is turned on and a viewer selects the operation of an automatic channel setting, a controller (not shown) operates the tuner, demultiplexer and decoder, and sequentially scans broadcast signals corresponding to individual broadcast channels. Whether the receiver receives the broadcast signal depends on whether the broadcast provider provides programs for individual broadcast channels. While scanning the broadcast channels, the controller determines the presence or absence of a broadcast signal for individual broadcast channels. The presence or absence of a broadcast signal is determined according to whether the tuner tunes the broadcast signal.

If it is determined that a broadcast signal is to be received via a channel, the controller determines the frequency band of the received broadcast signal to determine whether the broadcast signal is digital or analog. If the broadcast signal is analog, the channel is an effective channel and accordingly stored in a memory (not shown).

Alternatively, if the broadcast signal is digital, it is determined if the broadcast signal is demultiplexed to an audio and a video elementary stream (ES) by the demultiplexer. In this case, the presence or absence of a broadcast signal can be determined by determining whether the demultiplexer is operated or whether there is a program clock reference (PCR) packet identifier (PID), a video PID and an audio PID.

A digital broadcast signal may comprise a plurality of broadcast signals for a plurality of individual minor channels under a single program channel table (PCT). In order to distinguish the broadcast signals, individual minor channels are given with a proper identifier, which is a PID. Types of PIDs include PCR PIDs, video PIDs and audio PIDs, in which the PCR is data for spontaneously outputting a video signal and audio signal and prevents discordant lip-sync caused due to differences between a video signal and an audio signal.

Since the configuration of a digital broadcast receiving device and the process of storing broadcast channel data having a broadcast signal have already been described, further description is omitted.

The input unit 110 receives a user command for detecting whether digital channels are scrambled, and may be implemented with a key panel mounted on the broadcast receiving device 100, or with an external device such as a remote control.

The channel searching unit 120 is responsive to a user command input using the input unit 110 by scanning digital channels among the pre-stored broadcast channel data and checking the scrambling state of the digital channels. The scrambling state refers to the state where there is a broadcast signal but the original image or signal has been converted not to be shown normally. The broadcast channel data have been stored in the channel map storage unit 130, referring to data regarding all the broadcast channels having a broadcast signal.

The channel searching unit 120 determines whether a broadcast signal is digital or analog by determining the frequency band of the broadcast signal of the pre-stored broadcast channel data, and determines whether the broadcast signal is scrambled if the broadcast signal is digital. The channel searching unit 120 determines whether there is an audio signal and a video signal to determine whether digital broadcast data having a broadcast signal are scrambled. The process of decoding the audio signal and video signal by the decoder (not shown) must precede to determine whether there is an audio signal and a video signal. After completion of decoding, it is determined whether there is an audio signal and a video signal. If there is an audio signal and a video signal, it is determined that the received broadcast signal is a television broadcast signal and the corresponding channel is a descrambled channel. Alternatively, if there is only a video signal, the corresponding channel is determined to be a scrambled channel.

The channel map storage unit 130 stores broadcast channel data having a broadcast signal. The broadcast channel data having a broadcast signal are data relating to all the channels having a broadcast signal when automatically searching channels, comprising analog channels and digital channels, or scrambled channels and descrambled channels. Hereinafter, channels which are in a scrambled state among the digital channels are referred to as "scrambled" channels, and channels which are not in a scrambled state, i.e., in a descrambled state, which is a viewable state, are referred to as "descrambled" channels.

Figure 2:
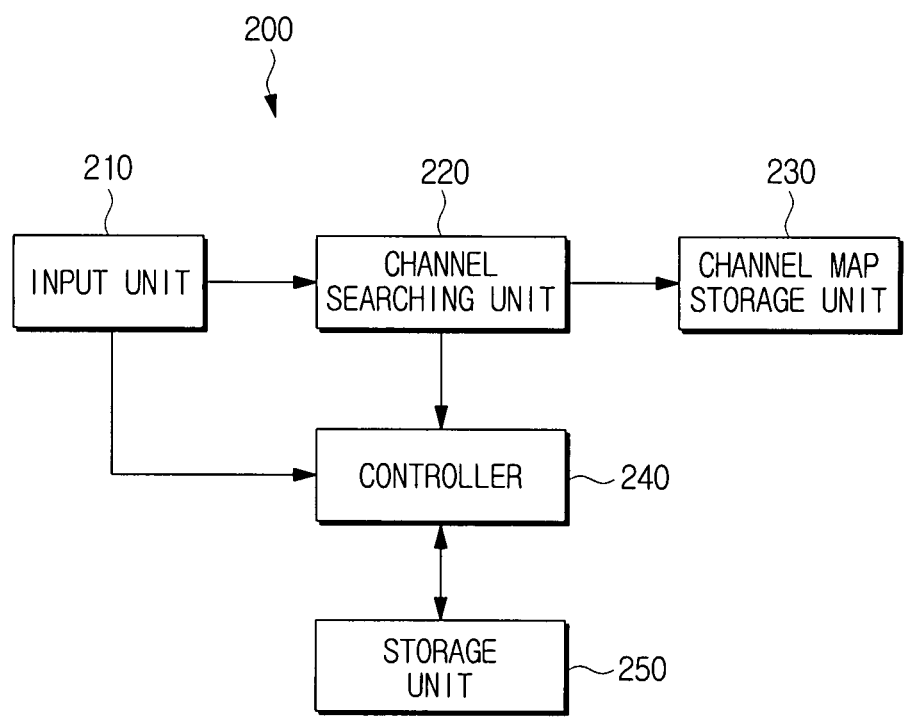
FIG. 2 is a block diagram of the configuration of a broadcast receiving device according to another exemplary embodiment of the present invention.

FIG. 2 is a block diagram of the configuration of a broadcast receiving device according to another exemplary embodiment of the present invention. In FIG. 2, the broadcast receiving device 200 comprises an input unit 210, a channel searching unit 220, a channel map storage unit 230, a controller 240 and a storage unit 250. The operation of the input unit 210, channel searching unit 220 and channel map storage unit 230 are the same as the operation of those of FIG. 1, so further detailed description is omitted.

The storage unit 250 stores data regarding effective channels. The effective channels refer to channels viewable due to the high sensitivity of a receiving unit (not shown) for receiving a broadcast signal. Data regarding the effective channels may be formed by detecting in operation (b) whether a broadcast signal is received according to whether the tuner is operated, whether the broadcast signal is demultiplexed according to whether the demultiplexer is operated, and whether there is an audio signal and a video signal using the decoder.

The controller 240 updates the data regarding the effective channels stored in the storage unit 250 according to the detection results of the channel searching unit 220. If the channel searching unit 220 searches digital channels changed from the scrambled state to the descrambled state, the controller 240 additionally stores data regarding the searched digital channels in the storage unit 250. On the contrary, if the channel searching unit 220 searches for digital channels which have changed from a descrambled state to a scrambled state, the controller 240 additionally deletes data regarding the searched digital channels from the storage unit 250. That is, a channel can be changed from a scrambled state to a descrambled state and vice versa by a digital broadcast provider, so such a channel can be updated on the channel list regarding effective channels.

Figure 3:
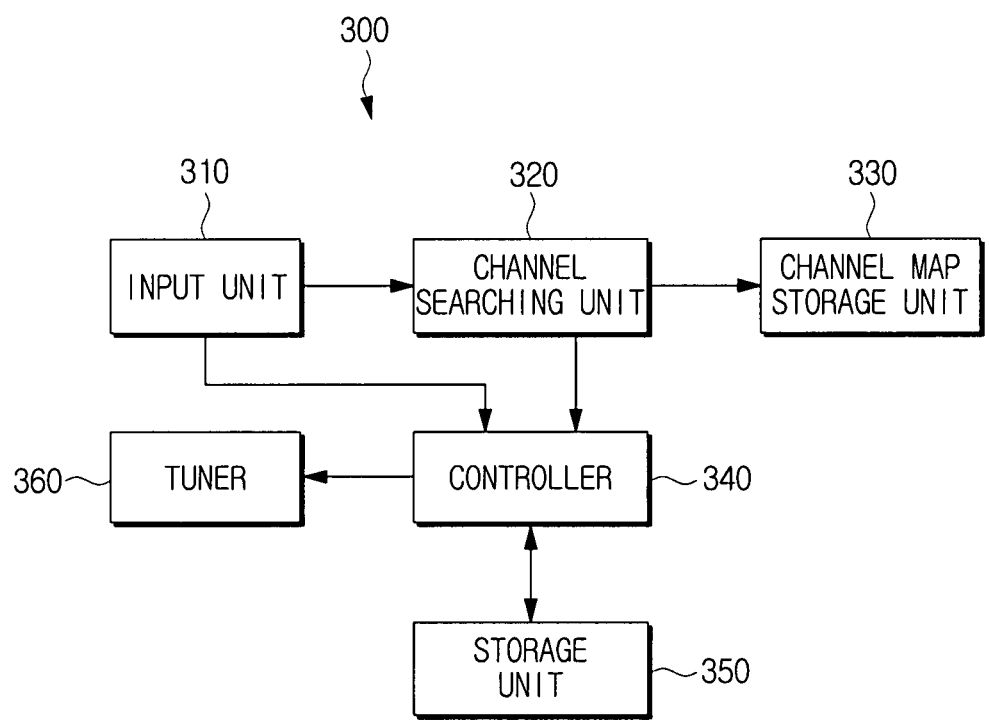
FIG. 3 is a block diagram of the configuration of a broadcast receiving device according to yet another exemplary embodiment of the present invention.

FIG. 3 is a block diagram of the configuration of a broadcast receiving device according to yet another exemplary embodiment of the present invention. In FIG. 3, the broadcast receiving device 300 comprises an input unit 310, a channel searching unit 320, a channel map storage unit 330, a controller 340, a storage unit 350 and a tuner 360. The functions of the input unit 310, channel searching unit 320, channel map storage unit 330, controller 340 and storage unit 350 are the same as the functions of those of FIG. 2, so detailed description is omitted.

The tuner 360 is responsive to a channel change command by tuning a channel to one of the effective channels stored in the storage unit 350 if a user inputs the channel change command using the input unit 310. The input unit 310 may receive a channel change command other than a user command to check the scrambling state as in FIG. 2.

For example, if the controller 340 updates and stores a channel changed from a scrambled state to a descrambled state in the storage unit 350, the tuner 260 can tune to the channel by selection of the channel of a user through the input unit 310.

Figure 4:
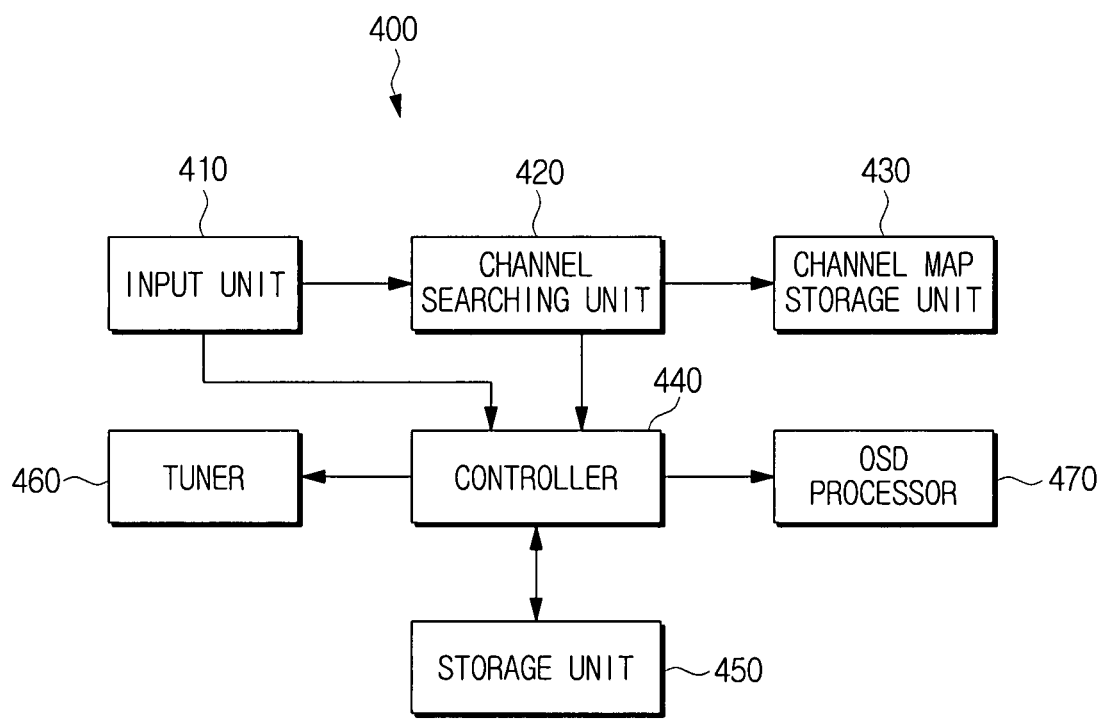
FIG. 4 is a block diagram of the configuration of a broadcast receiving device according to yet another exemplary embodiment of the present invention.

FIG. 4 is a block diagram of the configuration of a broadcast receiving device according to yet another exemplary embodiment of the present invention. In FIG. 4, the broadcast receiving device 400 comprises an input unit 410, a channel searching unit 420, a channel map storage unit 430, a controller 440, a storage unit 450, a tuner 460 and a on-screen display (OSD) processor 470. The functions of the input unit 410, channel searching unit 420, channel map storage unit 430, storage unit 450 and tuner 460 are the same as the functions of those of FIG. 3, so detailed description is omitted.

The OSD processor 470 displays the detection results of the channel searching unit 420 in OSD form. If the channel searching unit 420 detects a channel having a changed state regarding scrambling, the OSD processor 470 displays information regarding the detected channel in OSD form. In this case, the controller 440 may add or delete the data regarding the channel in OSD form to or from the storage unit 450 according to a user command input through the input unit 410.

In addition, if the channel searching unit 420 detects a channel having a changed state regarding scrambling, the OSD processor 470 may display an add or a delete menu corresponding to the detected channel as well as information regarding the detected channel in the OSD form. If the add menu is selected by a user, the controller 440 may add channel data corresponding to the selected add menu to the storage unit 450, and if the delete menu is selected by a user, the controller 440 may delete channel data corresponding to the selected delete menu from the storage unit 450.

FIGS. 5A-5F illustrate the detection results of the channel searching unit 420 displayed in OSD form.

In FIG. 5A, a list of all digital channels 9-1, 9-2, 9-4, 9-5, 11-2, 11-3, 11-5, 12-1 and 12-2 among the broadcast channel data having a broadcast signal is displayed on the screen, and the channel number and state of the channels 9-1, 9-4, 11-2, 11-5 and 12-2 having a changed state regarding scrambling are displayed on the screen. In this case, channels 9-4 and 11-5 changed from a scrambled state to a descrambled state may be added to the storage unit 450 for storing data regarding effective channels, and channels 9-1, 11-2 and 12-2 changed from a descrambled state to a scrambled state may be deleted from the storage unit 450. In this exemplary embodiment, the channel number appears on the left and the state regarding scrambling on the right, but variation in the locations is possible.

In FIG. 5B, from among all digital channels 9-1, 9-2, 9-4, 9-5, 11-2, 11-3, 11-5, 12-1 and 12-2 having a broadcast signal, channels 9-2, 9-5, 11-3 and 12-1 having a non-changed state regarding scrambling are not displayed on the screen, and only channels 9-1, 9-4, 11-2, 11-5 and 12-2 having a changed state regarding scrambling are displayed on the screen.

Figure 5C:
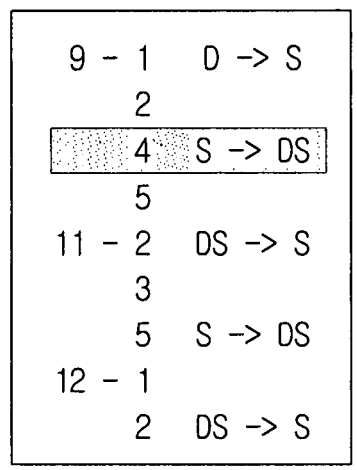

In FIG. 5C, a list of all digital channels 9-1, 9-2, 9-4, 9-5, 11-2, 11-3, 11-5, 12-1 and 12-2 having a broadcast signal are displayed on the screen, and the change of channels 9-1, 9-4, 11-2, 11-5 and 12-2 having a changed state regarding scrambling are displayed on the screen. For example, in the case of channel 9-1, the transition from a descrambled state to a scrambled state is shown.

Figure 5D:
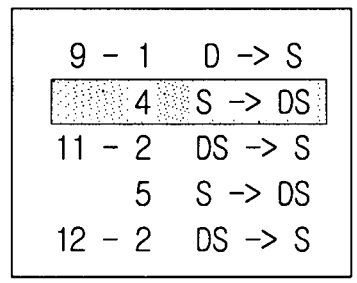

In FIG. 5D, from among all digital channels 9-1, 9-2, 9-4, 9-5, 11-2, 11-3, 11-5, 12-1 and 12-2 having a broadcast signal, channels 9-2, 9-5, 11-3 and 12-1 having a non-changed state regarding scrambling are not displayed on the screen, and only the channel number and change of channels 9-1, 9-4, 11-2, 11-5 and 12-2 having a changed state regarding scrambling are displayed on the screen.

In FIG. 5E, a list of all digital channels 9-1, 9-2, 9-4, 9-5, 11-2, 11-3, 11-5, 12-1 and 12-2 among broadcast channel data having a broadcast signal is displayed on the screen, and whether each channel is added to or deleted from the data regarding effective channels is displayed. That is, a channel indicated with "delete" is in a scrambled state and is thus deleted from the data regarding effective channels, and a channel indicated with "add" is in a descrambled state and is thus added to the data regarding effective channels.

In FIG. 5F, from among all digital channels 9-1, 9-2, 9-4, 9-5, 11-2, 11-3, 11-5, 12-1 and 12-2 having a broadcast signal, channels 9-2, 9-5, 11-3 and 12-1 having a non-changed state regarding scrambling are not displayed on the screen, and only the channel number and the addition or deletion of channels 9-1, 9-4, 11-2, 11-5 and 12-2 having a changed state regarding scrambling are displayed on the screen.

As described above, a user can know data regarding digital channels, which are added to or deleted from effective channel data, through the detected state regarding scrambling of digital channels displayed in the OSD form by the OSD processor 470.

Figure 6:
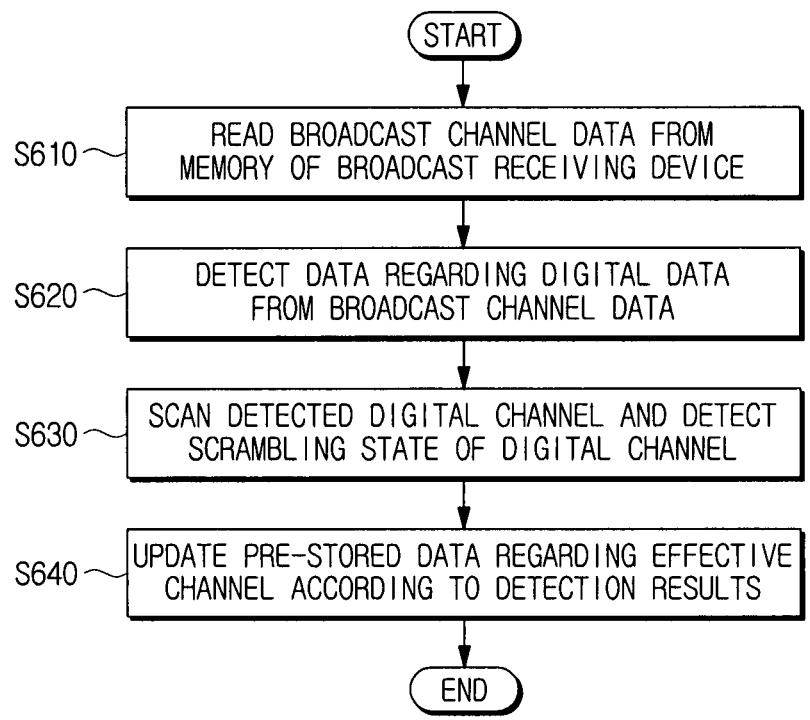
FIG. 6 is a flow diagram describing a method for searching channels according to an exemplary embodiment of the present invention.

FIG. 6 is a flow diagram describing a method for searching for channels according to an exemplary embodiment of the present invention. With reference to FIG. 6, if a user inputs a command to detect the state regarding scrambling of digital channels, broadcast channel data are read from the memory of the broadcast receiving device which stores the pre-scanned broadcast channel data in operation 610. The user can input the command using a key panel mounted on the broadcast receiving device or on an external device such as a remote control. The pre-scanned broadcast channel data are data regarding all of the broadcast channels having a broadcast signal, and may be stored in the memory when automatically searching channels. Next, data regarding digital channels are detected from among the broadcast channel data read from the memory in operation 620. That is, data regarding digital channels are detected from among data regarding all of the broadcast channels having a broadcast signal in operation 620.

Subsequently, the digital channels detected in operation 620 are scanned to detect the scrambling state of the digital channels in operation 630. The scrambled state refers to the state where there is a broadcast signal but the original image or signal has been converted not to be shown normally, so a scrambled channel may be determined not to be an effective channel. As digital broadcast providers can adjust the scrambling state of scrambled channels at any time, there is a need to detect the scrambling state of scrambled channels and update data regarding effective channels.

Subsequently, the pre-stored data regarding effective channels are updated according to the detection results in operation 630, in operation 640. In the updating operation 640, if a digital channel which has changed from a scrambled state to a descrambled state is detected in operation 630, data regarding the detected digital channel are added to the data regarding effective channels. Additionally, if a digital channel changed from a descrambled state to a scrambled state is detected in operation 630, data regarding the detected digital channel are deleted from the data regarding effective channels. In this manner, the data regarding effective channels are updated.

In operation 630, the detection results regarding the scrambling state may be displayed in the OSD.

More specifically, if a channel having a changed state regarding scrambling is detected in operation 630, information regarding the detected channel may be displayed in OSD form, and data regarding the channel displayed in OSD form may be added to or deleted from the effective channels.

Moreover, if a channel having a changed state regarding scrambling is detected in operation 630, information regarding the detected channel and an add or a delete menu corresponding to the detected channel may be displayed in the OSD form. In operation 640, if the add menu is selected by a user, channel data corresponding to the selected add menu may be added to the effective channels, and if the delete menu is selected by a user, channel data corresponding to the selected delete menu may be deleted from the effective channels.

Figure 7:
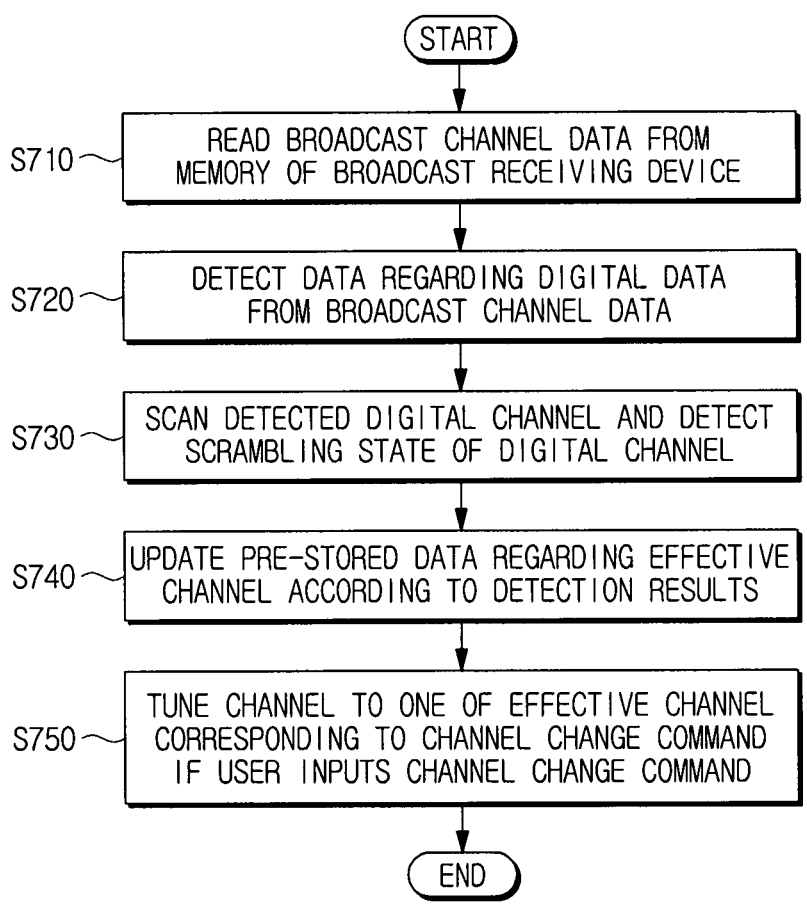
FIG. 7 is a flow diagram describing a method for searching channels according to another exemplary embodiment of the present invention.

FIG. 7 is a flow diagram describing a method for searching channels according to another exemplary embodiment of the present invention. With reference to FIG. 7, if a user inputs a command to detect the state regarding scrambling of digital channels, broadcast channel data are read from the memory of the broadcast receiving device which stores the pre-scanned broadcast channel data in operation 710. Next, data regarding digital channels are detected from among the broadcast channel data read from the memory in operation 720. Subsequently, the digital channels detected in operation 720 are scanned to detect the scrambling state of the digital channels in operation 730.

Subsequently, in operation 740, the pre-stored data regarding effective channels are updated according to the detection results in operation 730. In the updating operation 740, if a digital channel which has changed from a scrambled state to a descrambled state is detected in operation 730, data regarding the detected digital channel are added to the data regarding effective channels. Additionally, if a digital channel which has changed from a descrambled state to a scrambled state is detected in operation 730, data regarding the detected digital channel are deleted from the data regarding effective channels.

Next, in operation 750, if a user inputs a channel change command, a channel is tuned to one of the effective channels updated in operation 740 corresponding to the channel change command. The user can input the channel change command using the key panel mounted on the broadcast receiving device or an external device such as a remote control.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A broadcast receiving device comprising:
a channel map storage unit which stores broadcast channel data regarding broadcast channels including analog channels and digital channels;
an input unit which receives a command;
a channel searching unit which, in response to receiving the command, scans the digital channels to determine a scrambling state of the digital channels and updates the broadcast channel data stored in the channel map storage unit by removing at least one digital channel which is scrambled; and
an on-screen display (OSD) processor configured to display in an OSD form, in response to the channel searching unit determining that at least some of the digital channels have a changed scrambling state, information indicating whether the changed scrambling state changed (i) from a scrambled state to a descrambled state or (ii) from the descrambled state to the scrambled state.

2. The broadcast receiving device of claim 1, further comprising:
a storage unit which stores data regarding effective channels; and
a controller which updates the data stored in the storage unit according to a result of the determination of whether the digital channels are scrambled by the channel searching unit.

3. The broadcast receiving device of claim 2, wherein if the channel searching unit determines digital channels which changed from the scrambled state to the descrambled state, the controller adds data regarding the determined digital channels which changed from the scrambled state to the descrambled state to the storage unit, and if the channel searching unit determines digital channels which changed from the descrambled state to the scrambled state, the controller deletes data regarding the determined digital channels which changed from the descrambled state to the scrambled state from the storage unit.

4. The broadcast receiving device of claim 2, further comprising:
a tuner which tunes a channel to one of the effective channels stored in the storage unit in response to a channel change command if the channel change command is input to the input unit.

5. The broadcast receiving device of claim 2,
wherein the controller adds or deletes data regarding the at least some of the digital channels displayed in the OSD form to or from the storage unit according to an add or delete command input through the input unit.

6. The broadcast receiving device of claim 2,
wherein the OSD processor displays an add or a delete menu regarding the at least some of the digital channels having the changed scrambling state in the OSD form,
wherein the controller adds data regarding the at least some of the digital channels corresponding to the add menu to the storage unit if the add menu is selected, and the controller deletes data regarding the at least some of the digital channels corresponding to the delete menu from the storage unit if the delete menu is selected.

7. The broadcast receiving device of claim 1, wherein the stored broadcast channel data comprises data relating to scrambled channels and descrambled channels.

8. A method for searching channels of a broadcast receiving device comprising a memory which stores pre-scanned broadcast channel data regarding broadcast channels including analog channels and digital channels, the method comprising:
receiving a command;
in response to receiving the command, scanning the digital channels to determine a scrambling state of the digital channels and updating pre-stored data regarding effective channels by removing at least one digital channel which is scrambled; and
displaying in an on-screen display (OSD) form, in response to determining that at least some of the digital channels have a changed scrambling state, information indicating whether the changed scrambling state changed (i) from a scrambled state to a descrambled state or (ii) from the descrambled state to the scrambled state.

9. The method of claim 8, wherein in the updating, if digital channels which have changed from the scrambled state to the descrambled state are determined, data regarding the determined digital channels which have changed from the scrambled state to the descrambled state are added to the effective channels, and if digital channels which have changed from the descrambled state to the scrambled state are determined, data regarding the determined digital channels which have changed from the descrambled state to the scrambled state are deleted from the effective channels.

10. The method of claim 8, further comprising:
tuning a channel to one of the effective channels stored in the storage unit in response to a channel change command if the channel change command is input.

11. The method of claim 8, wherein in the updating, data regarding the at least some of the digital channels displayed in the OSD form are added to or deleted from the effective channels according to an add or delete command.

12. The method of claim 8, further comprising:
displaying an add or a delete menu regarding the at least some of the digital channels having the changed scrambling state in the OSD form, and in the updating, data regarding the at least some of the digital channels corresponding to the add menu are added to the effective channels if the add menu is selected, and data regarding the at least some of the digital channels corresponding to the delete menu are deleted from the effective channels if the delete menu is selected.

13. The method of claim 8, wherein the stored pre-scanned broadcast channel data comprises data relating to scrambled channels and descrambled channels.

14. A broadcast receiving device comprising:
a processor;
memory storing executable instructions that, when executed by the processor, causes the processor to perform the steps of:
storing broadcast channel data regarding broadcast channels including analog channels and digital channels;
receiving a command;
in response to receiving the command, scanning the digital channels to determine a scrambling state of the digital channels and updating the broadcast channel data stored in the channel map storage unit by removing at least one digital channel which is scrambled; and
displaying in an on-screen display (OSD) form, in response to determining that at least some of the digital channels have a changed scrambling state, information indicating whether the changed scrambling state changed (i) from a scrambled state to a descrambled state or (ii) from the descrambled state to the scrambled state.

* * * * *